United States Patent
Zhai et al.

(10) Patent No.: US 11,646,016 B2
(45) Date of Patent: May 9, 2023

(54) METHOD AND APPARATUS FOR RECOGNIZING USER INTENTION, DEVICE, AND READABLE STORAGE MEDIUM (71) Applicant: Baidu Online Network Technology (Beijing) Co., Ltd., Beijing (CN)

(72) Inventors: Zhouwei Zhai, Beijing (CN); Rongsheng Huang, Beijing (CN); Ben Xu, Beijing (CN); Fei You, Beijing (CN); Ning Li, Beijing (CN); Wensong He, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 469 days.

(21) Appl. No.: 17/024,668

(22) Filed: Sep. 17, 2020

(65) Prior Publication Data
US 2021/0256969 A1 Aug. 19, 2021

(30) Foreign Application Priority Data
Feb. 19, 2020 (CN) .......................... 202010102579.8

(51) Int. Cl.
G10L 15/18 (2013.01)
G06N 20/00 (2019.01)
G06N 5/04 (2023.01)
G10L 15/06 (2013.01)
G06F 40/216 (2020.01)
G06F 40/35 (2020.01)

(52) U.S. Cl.
CPC ........ *G10L 15/1822* (2013.01); *G06F 40/216* (2020.01); *G06F 40/35* (2020.01); *G06N 5/04* (2013.01); *G06N 20/00* (2019.01); *G10L 15/063* (2013.01)

(58) Field of Classification Search
None
See application file for complete search history.

(56) References Cited

U.S. PATENT DOCUMENTS

2020/0097563 A1* 3/2020 Alexander ............ G06F 16/61
2020/0320984 A1* 10/2020 Kuczmarski .......... G10L 15/005
2021/0150385 A1* 5/2021 Mallette .............. G06F 16/3329

FOREIGN PATENT DOCUMENTS

| CN | 109241261 A | 1/2019 |
| CN | 109284386 A | 1/2019 |
| CN | 109508376 A | 3/2019 |
| CN | 110298391 A | 10/2019 |
| CN | 110555096 A | 12/2019 |

(Continued)

*Primary Examiner* — Antim G Shah
(74) *Attorney, Agent, or Firm* — Nixon Peabody LLP (57) ABSTRACT

A method and apparatus for recognizing a user intention, a device, and a readable storage medium are disclosed. A specific implementation of the method includes: acquiring a plurality of rounds of dialogue data and a satisfaction degree of each round of dialogue data, selecting target dialogue data having a satisfaction degree meeting a set satisfaction condition; labeling input data in the target dialogue data with an intention label; and training the intention recognition model based on the input data in the target dialogue data and the intention label of the input data, so that the trained intention recognition model performs intention recognition on new input data.

17 Claims, 5 Drawing Sheets

(56) References Cited

FOREIGN PATENT DOCUMENTS

| | | |
|---|---|---|
| JP | 2001083986 A | 3/2001 |
| JP | 6199517 B1 | 9/2017 |
| JP | 2018151578 A | 9/2018 |
| JP | 2019215823 A | 12/2019 |
| WO | 2019085236 A1 | 5/2019 |
| WO | WO 2019/172946 A1 | 9/2019 |

\* cited by examiner

METHOD AND APPARATUS FOR RECOGNIZING USER INTENTION, DEVICE, AND READABLE STORAGE MEDIUM

CROSS-REFERENCE TO RELATED APPLICATIONS

This application claims priority to Chinese Patent Application No. 202010102579.8, filed with the China National Intellectual Property Administration (CNIPA) on Feb. 19, 2020, the contents of which are incorporated herein by reference in their entirety.

TECHNICAL FIELD

The present disclosure relates to computer technology, specifically to the technical field of natural language processing.

BACKGROUND

In the field of natural language processing, intention recognition is to recognize an intention of natural language, so as to provide a user with desired information based on an intention recognition result.

When performing intention recognition on the natural language, it includes three solutions as follows: 1) A method based on grammar: digging out a grammar template of a relevant context, as well as information such as a slot, and performing intention recognition using a matching method; 2) A method based on traditional machine learning: using a traditional classification algorithm for intention classification; and 3) A deep learning method based on neural networks.

The fitting ability and generalization ability of solution 3) are the best, but a large number of samples are needed to train a neural network model to ensure the accuracy of intention recognition of the model. Therefore, how to construct effective large number of samples is a difficult problem.

SUMMARY

Embodiments of the present disclosure provide a method for recognizing a user intention, an apparatus, device and readable storage medium, for filtering a large number of training samples automatically, and a high accuracy intention recognition model is trained and obtained, which improves the accuracy in intention recognition.

In a first aspect, some embodiments of the present disclosure provide a method for recognizing a user intention, the method includes:

acquiring a plurality of rounds of dialogue data and a satisfaction degree of each round of dialogue data, each round of dialogue data comprising input data of a user and response data, the response data being fed back based on an intention recognition result obtained by an intention recognition model performing an intention recognition on the input data;

selecting, from the plurality of rounds of dialogue data, target dialogue data having a satisfaction degree meeting a set satisfaction condition;

labeling input data in the target dialogue data with an intention label; and training the intention recognition model based on the input data in the target dialogue data and the intention label of the input data, so that the trained intention recognition model performs intention recognition on new input data.

In embodiments of the present disclosure, by acquiring a plurality of rounds of dialogue data and a satisfaction degree of each round of dialogue data, and selecting target dialogue data having a satisfaction degree meeting a set satisfaction condition, the dialogue data is used as a judgment dimension of the satisfaction degree, which effectively improves the recognition accuracy of the input data; using the satisfaction degree as a filter condition to select appropriate input data, so that when the intention recognition model is trained based on the input data and the intention label, a model of higher accuracy can be generated. In the present embodiment, the input data used for training is acquired by online recognition through the intention recognition model, and the input data is returned to offline training of the intention recognition model, thus a closed loop from online recognition to offline training is formed, which continuously mines a large number of high-accuracy samples based on the dialogue satisfaction degree, and drives the intention recognition model to be updated to higher accuracy; and with the continuous improvement of the model recognition accuracy, the accuracy of the input data may be higher and higher, and the satisfaction degree may be higher and higher, thus forming a virtuous circle, and finally improving the recognition accuracy of the intention recognition model.

Alternatively, the training the intention recognition model based on the input data in the target dialogue data and the intention label of the input data, comprises:

extracting a linguistic feature of the input data in the target dialogue data and a feature associated with the input data; and training the intention recognition model by using the linguistic feature of the input data and the feature associated with the input data as an input, and using the intention label as a target output;

where, the feature associated with the input data comprises at least one of: a search demand of the input data, response data of the input data, context data of the input data, or statistical data of the input data.

According to an implementation of the present disclosure, the linguistic feature of the input data and the associated feature are used as the inputs of the model, which more accurately reflects the user intention at the feature level, which is beneficial to improve the recognition accuracy when the intention recognition is performed at the feature level; the features associated with the input data are features introduced to better recognize the intention of input data, these features reflect, from one aspect, the user intention, and play a good auxiliary role in recognizing the intention of the input data.

Alternatively, before the training the intention recognition model based on the input data in the target dialogue data and the intention label of the input data, the method further comprises:

acquiring types of source terminals of the input data in the target dialogue data;

the training the intention recognition model based on the input data in the target dialogue data and the intention label of the input data, comprises:

grouping the input data in the target dialogue data according to the types of the source terminals to obtain a plurality of groups of input data;

training, based on a group of input data and an intention label of the group of input data, an intention recognition model corresponding to a type of a source terminal of the group of input data;

where, the types of the source terminals comprise a screen terminal type and a screenless terminal type.

According to an implementation of the present disclosure, the input data is grouped based on the screen terminal type and the screenless terminal type, and the intention recognition models corresponding to the types of source terminals are grouped trained, to obtain the intention recognition models applicable to the screen terminal and the screenless terminal respectively, and improve the accuracy of intention recognitions of the screen terminal and the screenless terminal.

Alternatively, the acquiring the plurality of rounds of dialogue data and the satisfaction degree of each round of dialogue data, comprises:

pulling, according to a set period, a satisfaction degree feedback log of a most recent period, the satisfaction degree feedback log comprising the plurality of rounds of dialogue data and the satisfaction degree of each round of dialogue data;

the training the intention recognition model based on the input data in the target dialogue data and the intention label of the input data, comprises:

training, according to the set period, the intention recognition model based on the input data in the target dialogue data and the intention label of the input data.

According to an implementation of the present disclosure, the satisfaction degree feedback log may automatically collect the user's dialogue data and satisfaction degree. Using the satisfaction degree feedback log as the data source, the dialogue data and the satisfaction degree of the dialogue data may be acquired more conveniently and quickly, without additional programming; by pulling the satisfaction degree feedback log of the most recent period according to the set period, and training the intention recognition model according to the set period, so that the model training is performed automatically according to the set period; and at the same time, it is ensured that the model can be updated in time with new online input data.

Alternatively, before the pulling the satisfaction degree feedback log of the most recent period according to the set period, the satisfaction degree feedback log comprising the plurality of rounds of dialogue data and the satisfaction degree of each round of dialogue data, the method further comprises:

acquiring the plurality of rounds of dialogue data from a user behavior log;

scoring, by using a satisfaction degree scoring model, the satisfaction degree of each round of dialogue data in the plurality of rounds of dialogue data, to obtain a satisfaction degree score of each round of dialogue data; and storing the plurality of rounds of dialogue data and the satisfaction degree score of each round of dialogue data to the satisfaction degree feedback log.

According to an implementation of the present disclosure, the user behavior log may automatically collect the user's dialogue data. Using the user behavior log as the data source, the dialogue data may be acquired more conveniently and quickly, without additional programming; the satisfaction degree score of the dialogue data is obtained through the satisfaction degree scoring model, a method for acquiring satisfaction degree is specified; moreover, the satisfaction degree scoring model may be used to score the satisfaction degree objectively and in accordance with a unified standard, which improves the authenticity of the satisfaction degree score; in the case of a large amount of dialogue data, satisfaction degree scores can be obtained quickly and accurately using the satisfaction degree scoring model.

Alternatively, the acquiring the plurality of rounds of dialogue data from the user behavior log, comprises:

collecting a plurality of rounds of candidate dialogue data using the user behavior log, wherein each round of candidate dialogue data comprises input data of a user and response data, the response data being fed back based on an intention recognition result obtained by an intention recognition model performing an intention recognition on the input data; and acquiring, based on the intention recognition model, an intention confidence of the input data in each round of candidate dialogue data; and selecting, from the user behavior log, input data having an intention confidence meeting a set confidence condition and response data of the input data, to form the plurality of rounds of dialogue data.

According to an implementation of the present disclosure, the user behavior log may collect a plurality of candidate dialogue data, while the intention confidence of the input data in these candidate dialogue data may be high or low. The higher the intention confidence, the higher the probability that the input data is the intention and the higher the recognition accuracy. Therefore, filtering the input data of high intention confidence by using a confidence condition means filtering the input data having high recognition accuracy. In this way, when the filtered input data is used as feedback data fort the model training, the intention recognition accuracy of the model is further improved.

Alternatively, the labeling the input data in the target dialogue data with the intention label, comprises:

acquiring category information and instruction information of the response data in the target dialogue data;

determining the intention label of the input data in the target dialogue data based on the category information and the instruction information, and a mapping relationship between the intention label and the category information and the instruction information; and labeling the input data in the target dialogue data with the intention label.

According to an implementation of the present disclosure, considering that there are many intention labels in the intention recognition model in practical applications, which may reach thousands; not all of the intentions could be trained using input data. By setting a corresponding relationship between the intention label and the category information and the instruction information, intention labels that can be trained with input data may be flexibly selected, and the recognition accuracy of some intentions may be selectively improved without affecting the recognition accuracy of the other intentions. Moreover, automatic labeling is performed by means of intention label mapping, without manual involvement, which improves the efficiency and accuracy of labeling.

In a second aspect, some embodiments of the present disclosure provide an apparatus for recognizing a user intention. The apparatus includes:

an acquisition module, configured to acquire a plurality of rounds of dialogue data and a satisfaction degree of each round of dialogue data, each round of dialogue data comprising input data of a user and response data, the response data being fed back based on an intention recognition result obtained by an intention recognition model performing an intention recognition on the input data;

a selection module, configured to select, from the plurality of rounds of dialogue data, target dialogue data having a satisfaction degree meeting a set satisfaction condition;

a labeling module, configured to label input data in the target dialogue data with an intention label; and a training module, configured to train the intention recognition model based on the input data in the target dialogue data and the intention label of the input data, so that the trained intention recognition model performs intention recognition on new input data.

In a third aspect, some embodiments of the present disclosure provide an electronic device, the electronic device includes:

at least one processor; and a memory, communicatively connected to the at least one processor; where the memory, storing instructions executable by the at least one processor, the instructions, when executed by the at least one processor, cause the at least one processor to perform the method for recognizing a user intention according to the first aspect.

In a fourth aspect, some embodiments of the present disclosure provide a non-transitory computer readable storage medium, storing computer instructions, the computer instructions, being used to cause a computer to perform the method for recognizing a user intention according to the first aspect.

The other effects of the above alternative methods will be described below in combination with specific embodiments.

BRIEF DESCRIPTION OF THE DRAWINGS

Accompanying drawings are used to better understand the present solution and do not constitute a limitation to the present disclosure, in which.

DETAILED DESCRIPTION OF EMBODIMENTS

The following describes exemplary embodiments of the present disclosure in conjunction with the accompanying drawings, which includes various details of the embodiments of the present disclosure to facilitate understanding, and they should be considered as merely exemplary. Therefore, those of ordinary skill in the art should recognize that various changes and modifications may be made to the embodiments described herein without departing from the scope and spirit of the present disclosure. Also, for clarity and conciseness, descriptions of well-known functions and structures are omitted in the following description.

Embodiment 1

Figure 1:
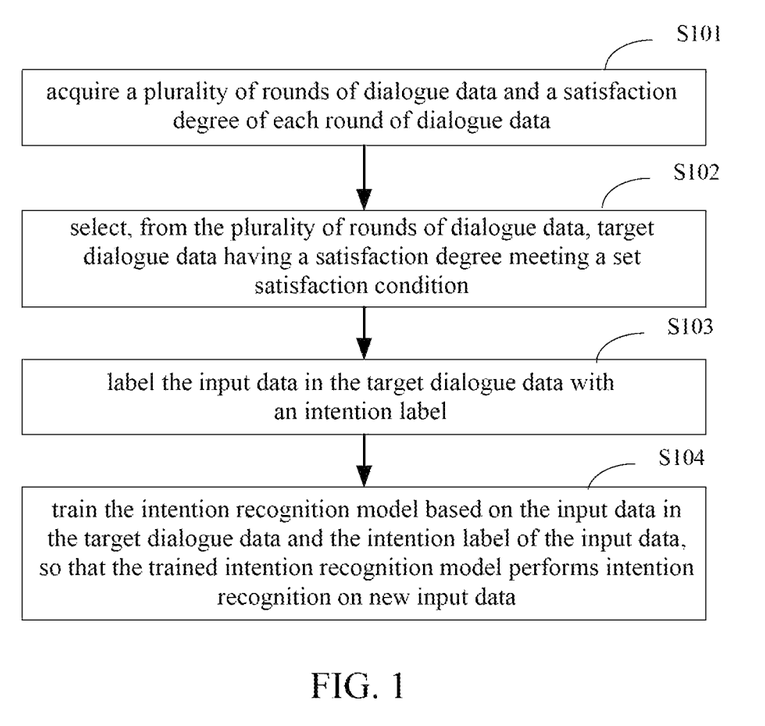
FIG. 1 is a flowchart of a method for recognizing a user intention in Embodiment 1 of the present disclosure.

FIG. 1 is a flowchart of a method for recognizing a user intention in Embodiment 1 of the present disclosure. The embodiment of the present disclosure is applicable to the situation where an intention recognition model is used to perform intention recognition on input data of a user. The method is performed by an apparatus for recognizing a user intention, which is implemented by software and/or hardware, and is specifically configured in an electronic device having certain data computing capabilities.

A method for recognizing a user intention as shown in FIG. 1, includes:

S101, acquire a plurality of rounds of dialogue data and a satisfaction degree of each round of dialogue data.

In the present embodiment, dialogue data refers to online dialogue data between a user and a Conversational smart terminal (hereinafter referred to as terminal), or referred to as interaction data. Here, the Conversational smart terminal includes a smart speaker, a smart TV, etc., and is communicatively connected with the electronic device in the present embodiment. A round of dialogue data includes input data of the user and response data. The input data may be data of voice format or data of text format. The response data is fed back according to an intention recognition result obtained by an intention recognition model performing an intention recognition on the input data.

The intention recognition model may be a multi-classification neural network model, such as a model constructed by a convolutional neural network model and a multi-classification model, or a model constructed by a recurrent neural network model and a multi-classification model. Alternatively, the intention recognition model may be configured in the terminal and the electronic device at the same time, and the intention recognition model in the terminal and the electronic device can be kept synchronized.

The plurality of rounds of dialogue data are continuous dialogue data generated in chronological order. In general, the dialogue data of the preceding and subsequent rounds are in a same dialogue scenario, and discussing a certain topic. For example, in the first round of dialogue data, the user says: "children's song"; the terminal uses the intention recognition model to perform intention recognition on "children's song" to obtain an intention recognition result, and feeds back "which children's song do you want" based on the intention recognition result. In the second round of dialogue data, the user says: "any children's song"; the terminal continues to use the intention recognition model to perform intention recognition on "any children's song" to obtain an intention recognition result and performs a children's song playback operation based on the intention recognition result, and feeds back data corresponding to the children's song playback operation.

The satisfaction degree of dialogue data refers to the satisfaction degree of the user with the dialogue data. For example, if the user repeatedly says the same sentence and the terminal gives different response data or gives response data without content, the satisfaction degree of the dialogue data is low; if the user replies to the preceding round of response data with positive semantics, such as "Yes" or "Good", the satisfaction degree of the dialogue data is high. Obviously, the satisfaction degree reflects the accuracy of intention recognition.

S102, select, from the plurality of rounds of dialogue data, target dialogue data having a satisfaction degree meeting a set satisfaction condition.

If the satisfaction degree of the dialogue data meets the set satisfaction condition, the dialogue data is satisfactory to the user, and the intention recognition in the dialogue data is accurate. Alternatively, if the satisfaction degrees are expressed by levels, the set satisfaction condition may be that the satisfaction degree is higher than a set level; if the satisfaction degrees are expressed by scores, the set satisfaction condition may be that the score of the satisfaction degree is greater than a set threshold. In order to facilitate description and distinction, the dialogue data having a satisfaction degree meeting the set satisfaction condition is referred to as target dialogue data.

Alternatively, the satisfaction degree of the dialogue data may be evaluated online by users or evaluated offline using a satisfaction degree scoring model. Here, the evaluated online by users may include inputting satisfaction or dissatisfaction by the users after a round of dialogue is completed.

S103, label the input data in the target dialogue data with an intention label.

In an alternative embodiment, the intention recognition result of the input data is directly labeled as the intention label.

In another alternative embodiment, considering that there may be a small amount of errors in the intention recognition result of the input data, the input data is manually labeled with an intention label.

S104, train the intention recognition model based on the input data in the target dialogue data and the intention label of the input data, so that the trained intention recognition model performs intention recognition on new input data.

In the present embodiment, the input data selected based on the satisfaction degree is used as training samples to train the intention recognition model, so as to use the dialogue satisfaction degree to automatically dig out a large number of samples for training the intention recognition model.

Since the input data in the target dialogue data is data having high recognition accuracy, that is, the intention recognition result of the input data is basically a correct result, so when the intention recognition model is trained based on the input data and intention label, a model of higher accuracy can be generated.

In the present embodiment, the intention recognition model is trained offline based on the input data and the intention label of the input data acquired online, and the trained intention recognition model is updated to the terminal, so that the terminal uses the intention recognition model to continue to perform online intention recognition on new input data, forming a closed loop of the intention recognition method driven by the satisfaction degree.

In embodiments of the present disclosure, by acquiring a plurality of rounds of dialogue data and a satisfaction degree of each round of dialogue data, and selecting target dialogue data having a satisfaction degree meeting a set satisfaction condition, the dialogue data is used as a judgment dimension of the satisfaction degree, which effectively improves the recognition accuracy of the input data; using the satisfaction degree as a filter condition to select appropriate input data, so that when the intention recognition model is trained based on the input data and the intention label, a model of higher accuracy can be generated. In the present embodiment, the input data used for training is acquired by online recognition through the intention recognition model, and the input data is returned to offline training of the intention recognition model, thus a closed loop from online recognition to offline training is formed, which continuously mines a large number of high-accuracy samples based on the dialogue satisfaction degree, and drives the intention recognition model to be updated to higher accuracy; and with the continuous improvement of the model recognition accuracy, the accuracy of the input data may be higher and higher, and the satisfaction degree may be higher and higher, thus forming a virtuous circle, and finally improving the recognition accuracy of the intention recognition model.

Embodiment 2

Figure 2:
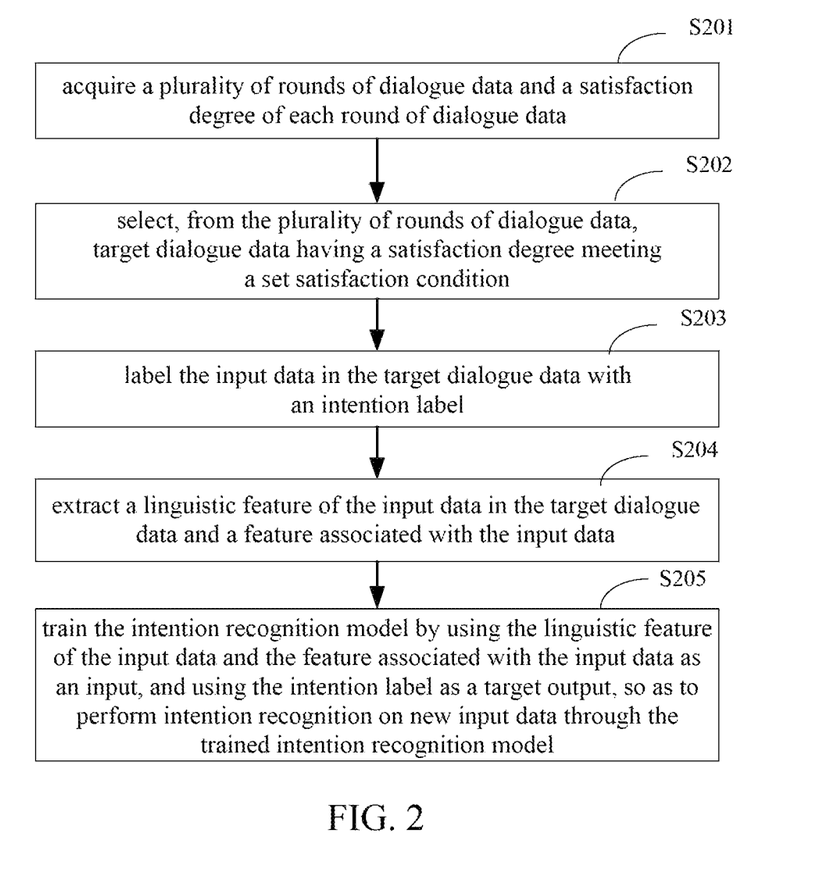
FIG. 2 is a flowchart of a method for recognizing a user intention in Embodiment 2 of the present disclosure.

FIG. 2 is a flowchart of a method for recognizing a user intention in Embodiment 2 of the present disclosure. The embodiment of the present disclosure is optimized and improved on the basis of the technical solution of the foregoing embodiment.

Further, the operation "training the intention recognition model based on the input data in the target dialogue data and the intention label of the input data" is refined into "extracting a linguistic feature of the input data in the target dialogue data and a feature associated with the input data; training the intention recognition model by using the linguistic feature of the input data and the feature associated with the input data as an input, and using the intention label as a target output; where, the feature associated with the input data includes at least one of: a search demand of the input data, response data of the input data, context data of the input data, or statistical data of the input data", and the intention recognition is performed at the feature level.

A method for recognizing a user intention as shown in FIG. 2, includes:

S201, acquire a plurality of rounds of dialogue data and a satisfaction degree of each round of dialogue data.

Each round of dialogue data includes input data of a user and response data, the response data is fed back based on an intention recognition result obtained by an intention recognition model performing an intention recognition on the input data.

S202, select, from the plurality of rounds of dialogue data, target dialogue data having a satisfaction degree meeting a set satisfaction condition.

S203, label the input data in the target dialogue data with an intention label.

S204, extract a linguistic feature of the input data in the target dialogue data and a feature associated with the input data.

Alternatively, if the input data is data of voice format, it is necessary to perform voice recognition on the input data to obtain data of text format. If the input data is data of text format, no additional processing is required. The extracting a linguistic feature of the input data in the target dialogue data includes: extracting a linguistic feature such as lexical, syntax and semantics of the input data of text format in the target dialogue data.

Here, the feature associated with the input data includes at least one of: a search demand of the input data, response data of the input data, context data of the input data, or statistical data of the input data.

The search demand of the input data is demand for a content when the input data is used as a search term. For example, network search results are obtained when the input data is used as the search term, and the result ranked first in the network search results is selected as the search demand. In an actual application scenario, it takes a long time to acquire the search demand through web search. In order to reduce time-consuming, input data that the user may input is pre-constructed, and a search demand is acquired through web search on the constructed input data in advance. The constructed input data and the search demand are written into a dictionary. After acquiring the input data in the target dialogue data, the search demand is obtained by querying in the dictionary based on the input data.

The response data of the input data includes category information and instruction information, where the category information includes vertical category information and sub-category information. For example, if the vertical category information is music, the sub-category information of music is music control, and the instruction information is stop playing, then the response data constructed by the category information and the instruction information is: stop playing the current music.

The context data of input data can reflect the context of the input data, including historical input data and subsequent input data of the input data. The historical input data and the subsequent input data may be acquired from the preceding round and the subsequent round of dialogue data. It may be understood that the input data and its context data should come from the same user.

The statistical data of the input data includes a frequency of occurrence of the input data in a preset duration, a length of the input data, and a linguistic model of the input data, etc.

S205, train the intention recognition model by using the linguistic feature of the input data and the feature associated with the input data as an input, and use the intention label as a target output, so as to perform intention recognition on new input data through the trained intention recognition model.

It should be noted that the features input to the model should be aligned during the recognition and training of the intention recognition model. That is, if the linguistic feature of the input data and the feature associated with the input data are used as inputs during the training the intention recognition model, then when the intention recognition model performs recognition it should also use the linguistic feature of the input data and the feature associated with the input data as inputs. Based on this, the intention recognition model needs to extract the linguistic feature of the current input data of the user and the feature associated with the current input data before performing recognition. In the features associated with the current input data, the response data of the current input data may be the response data in the dialogue data of the preceding round. This is because the topics of the dialogue data of the preceding round and the subsequent round are basically the same, and the response data in the dialogue data of the preceding round may also assist in recognizing the intention of the current input data. The context data of the input data only includes historical input data, i.e. the context data, of the current input data.

In the present embodiment, the linguistic feature of the input data and the associated feature are used as the inputs of the model, which more accurately reflects the user intention at the feature level, which is beneficial to improve the recognition accuracy when the intention recognition is performed at the feature level; the features associated with the input data are features introduced to better recognize the intention of input data, these features reflect, from one aspect, the user intention, and play a good auxiliary role in recognizing the intention of the input data.

Embodiment 3

Figure 3:
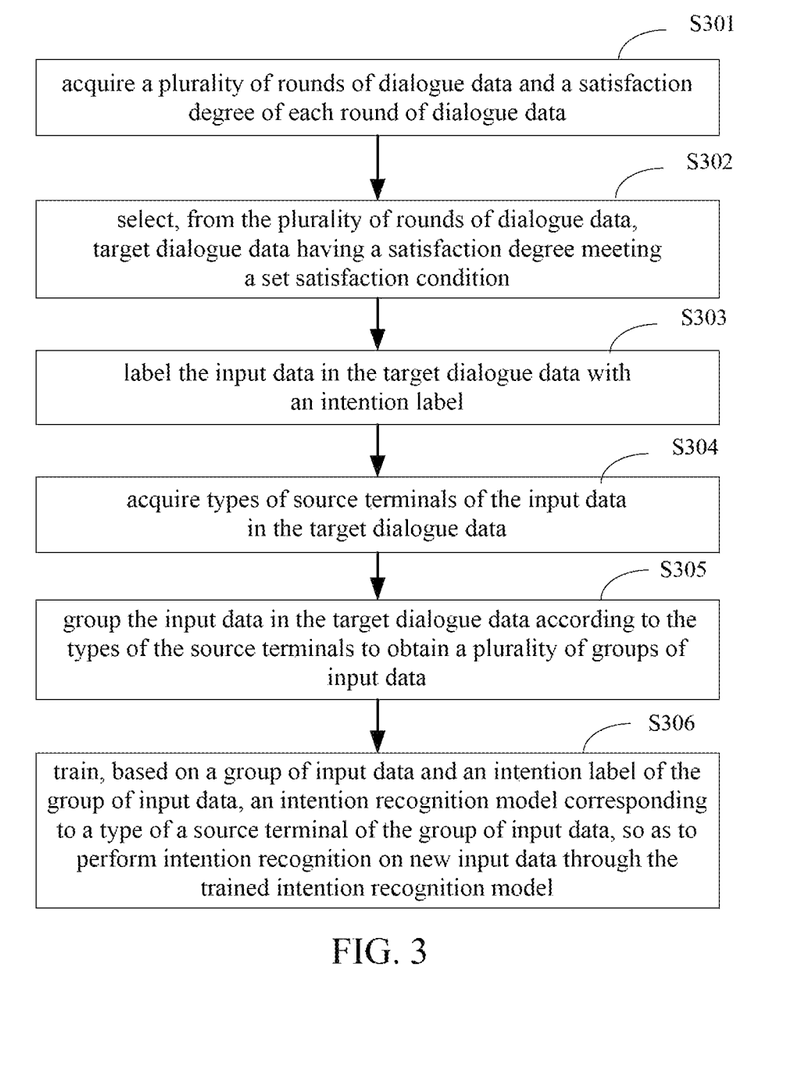
FIG. 3 is a flowchart of a method for recognizing a user intention in Embodiment 3 of the present disclosure.

FIG. 3 is a flowchart of a method for recognizing a user intention in Embodiment 3 of the present disclosure. The embodiment of the present disclosure is optimized and improved on the basis of the technical solutions of the foregoing embodiments.

Further, before the operation "train the intention recognition model based on the input data in the target dialogue data and the intention label of the input data", an operation "acquire types of source terminals of the input data in the target dialogue data" is added, and accordingly, the operation "train the intention recognition model based on the input data in the target dialogue data and the intention label of the input data" is refined into "group the input data in the target dialogue data according to the types of the source terminals to obtain a plurality of groups of input data; train an intention recognition model corresponding to the a type of a source terminal of each group of input data, based on each group of input data and an intention label of each group of input data; where, the types of the source terminals include a screen terminal type and a screenless terminal type", so that an intention recognition model suitable for the screen terminal and the screenless terminal are obtained respectively.

A method for recognizing a user intention as shown in FIG. 3, includes:

S301, acquire a plurality of rounds of dialogue data and a satisfaction degree of each round of dialogue data.

Each round of dialogue data includes input data of a user and response data, the response data is fed back based on an intention recognition result obtained by an intention recognition model performing an intention recognition on the input data.

S302, select, from the plurality of rounds of dialogue data, target dialogue data having a satisfaction degree meeting a set satisfaction condition.

S303, label the input data in the target dialogue data with an intention label.

S304, acquire types of source terminals of the input data in the target dialogue data.

In the present embodiment, the type of the source terminal, i.e. the conversational smart terminal, mainly includes a screen terminal type and a screenless terminal type. Screen terminals include smart TVs and speakers with screens, and screenless terminals include screenless speakers.

Alternatively, source terminal information of the input data in the target dialogue data is acquired, such as source terminal name, whether the source terminal is a smart TV, a speaker with a screen or a speaker without a screen. A mapping relationship between the source terminal information and the type of the source terminal is preset, and the type of a source terminal mapped by the source terminal information of the input data in the target dialogue data is determined according to the mapping relationship.

In some application scenarios, when a screenless terminal used for the dialogue is connected to an end terminal with a screen, then, the screenless terminal should be regarded as a screen terminal. Based on this, the source terminal information should also include the terminal type of the end terminal connected to the source terminal. If the end terminal is the screen terminal type, the source terminal type mapped by the source terminal information is the screen terminal type; if the end terminal is the screenless terminal type, the source terminal type mapped by the source terminal information is the screenless terminal type.

S305, group the input data in the target dialogue data according to the types of the source terminals to obtain a plurality of groups of input data.

In the present embodiment, each round of dialogue data carries the type of the source terminal of the input data. Based on this, the input data with the same source terminal type is grouped into a same group. Specifically, the input data belonging to the screen terminal type is grouped into a group, and the input data belonging to the screenless terminal type is grouped into another group.

S306, train, based on a group of input data and an intention label of the group of input data, an intention recognition model corresponding to a type of a source terminal of the group of input data, so as to perform intention recognition on new input data through the trained intention recognition model.

In general, the screen terminal may display some information on the screen to guide the user to input data; moreover, the screen terminal can provide video playback and graphic and text display functions that a screenless terminal does not have, therefore, the response data of the screen terminal and the screenless terminal are different. Based on the above analysis, it is necessary to train intention recognition models that are applicable to the screen terminal and the screenless terminal respectively, that is, to train the intention recognition model corresponding to the screen terminal type and the intention recognition model corresponding to the screenless terminal type respectively.

Alternatively, the structures of the intention recognition model corresponding to the screen terminal type and the intention recognition model corresponding to the screenless terminal type may be the same or different. Specifically, based on the input data belonging to the screen terminal type and the intention label of the input data, the intention recognition model corresponding to the screen terminal type is trained, and based on the input data belonging to the screenless terminal type and the intention label of the input data, the intention recognition model corresponding to the screenless terminal type is trained.

In embodiments of the present disclosure, the input data is grouped based on the screen terminal type and the screenless terminal type, and the intention recognition models corresponding to the types of source terminals are grouped trained, to obtain the intention recognition models applicable to the screen terminal and the screenless terminal respectively, and improve the accuracy of intention recognitions of the screen terminal and the screenless terminal.

Embodiment 4

Figure 4:
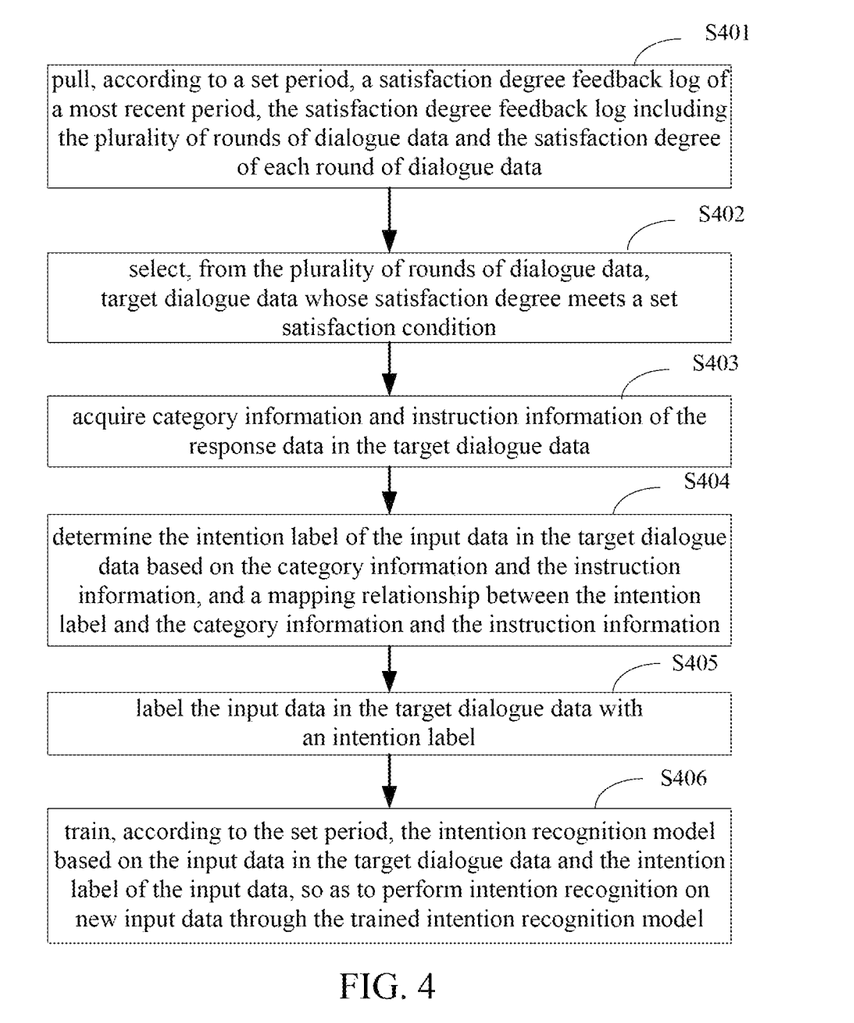
FIG. 4 is a flowchart of a method for recognizing a user intention in Embodiment 4 of the present disclosure.

FIG. 4 is a flowchart of a method for recognizing a user intention in Embodiment 4 of the present disclosure. The embodiment of the present disclosure is optimized and improved on the basis of the technical solutions of the foregoing embodiments.

Further, the operation "acquire a plurality of rounds of dialogue data and a satisfaction degree of each round of dialogue data" is refined into "pull, according to a set period, a satisfaction degree feedback log of a most recent period, the satisfaction degree feedback log including the plurality of rounds of dialogue data and the satisfaction degree of each round of dialogue data", and accordingly, the operation "train the intention recognition model based on the input data in the target dialogue data and the intention label of the input data" is refined into "train, according to the set period, the intention recognition model based on the input data in the target dialogue data and the intention label of the input data", thereby the intention recognition model is trained automatically and periodically.

Further, the operation "label the input data in the target dialogue data with an intention label" is refined into "acquire category information and instruction information of the response data in the target dialogue data; determine the intention label of the input data in the target dialogue data based on the category information and the instruction information, and a mapping relationship between the intention label and the category information and the instruction information; and label the input data in the target dialogue data with the intention label", so that intention labels that can be trained with input data are selected flexibly.

A method for recognizing a user intention as shown in FIG. 4, includes:

S401, pull, according to a set period, a satisfaction degree feedback log of a most recent period, the satisfaction degree feedback log including the plurality of rounds of dialogue data and the satisfaction degree of each round of dialogue data.

The set period is a custom period, such as one week. The most recent period is a period obtained by extending forward a set duration from the current time as the cut-off time. For example, if the current time is February 1, and the set duration is one month, then the most recent period is from January 1 to February 1.

The satisfaction degree feedback log may automatically collect dialogue data and the satisfaction degree of the dialogue data over time. The satisfaction degree feedback log in the most recent period includes a plurality of rounds of dialogue data and the satisfaction degree of each round of dialogue data collected in the most recent period.

Alternatively, a process of generating the satisfaction degree feedback log is also included before S401: the first step: acquiring the plurality of rounds of dialogue data from a user behavior log; the second step: scoring, by using a satisfaction degree scoring model, the satisfaction degree of each round of dialogue data in the plurality of rounds of dialogue data, to obtain a satisfaction degree score of each round of dialogue data; and the third step: storing the plurality of rounds of dialogue data and the satisfaction degree score of each round of dialogue data to the satisfaction degree feedback log.

In the first step, the plurality of rounds of candidate dialogue data are collected by using the user behavior log, where each round of candidate dialogue data includes input data of a user and response data, the response data being fed back based on an intention recognition result obtained by an intention recognition model performing an intention recognition on the input data; acquiring, based on the intention recognition model, an intention confidence of the input data in each round of candidate dialogue data; and selecting, from the user behavior log, input data having an intention confidence meeting a set confidence condition and response data of the input data, to form the plurality of rounds of dialogue data. During online recognition by the intention recognition model, the user behavior log may continuously collect dialogue data between the user and the conversational smart terminal, which is referred to as candidate dialogue data. Intention recognition is performed on the input data in each round of candidate dialogue data by the intention recognition model, and then the intention recognition result and the intention confidence are obtained. The intention confidence of the input data in these candidate dialogue data may be high or low. The higher the intention confidence, the higher the probability that the input data is the intention and the higher the recognition accuracy. The set confidence condition may be that the intention confidence is greater than a confidence threshold, or when the intention confidence is sorted in descending order, the sorting position is the first preset number, for example, the first five. Therefore, the input data having high intention confidence is selected according to the confidence condition, that is, the input data having high recognition accuracy is selected, so that when the selected input data is used as feedback data for model training, the intention recognition accuracy of the model can be further improved.

In the second step, in order to improve the efficiency of satisfaction degree evaluation, the satisfaction degree scoring model is used for offline scoring. Specifically, a response time, a playback duration, the relevance between a response content and the user's intention, etc. corresponding to each round of dialogue data are input into the satisfaction degree scoring model, to obtain the satisfaction degree score output by the satisfaction degree scoring model.

In the third step, whenever the user behavior log collects a new round of dialogue data, the satisfaction degree scoring model is used to score the satisfaction degree of the new round of dialogue data, to obtain the satisfaction degree score of the new round of dialogue data. The new round of dialogue data and its satisfaction degree score are stored to the satisfaction degree feedback log. In this way, as the user behavior log continuously and automatically collects the user's dialogue data, the satisfaction degree feedback log also automatically collects the user's dialogue data and the satisfaction degree.

S402, select, from the plurality of rounds of dialogue data, target dialogue data whose satisfaction degree meets a set satisfaction condition.

Alternatively, the target dialogue data whose satisfaction degree score is greater than the set threshold is selected from the plurality of rounds of dialogue data. By selecting the target dialogue data whose satisfaction degree score is greater than the set threshold, the input data having high recognition accuracy may be selected, and furthermore, when the intention recognition model is trained based on the input data and the intention label, a model having higher accuracy can be generated.

S403, acquire category information and instruction information of the response data in the target dialogue data.

Alternatively, the category information and the instruction information of the response data in the target dialogue data may be acquired from the satisfaction degree feedback log.

It should be noted that the satisfaction degree feedback log stores information in a field format, specifically, stores a plurality of rounds of dialogue data (query), the satisfaction degree of each round of dialogue data (qs), a terminal identifier or user identifier (cuid), time (time), a terminal type or terminal information (device_type), vertical information (bot), sub-category information (domain) and instruction information (intent).

Here, cuid is used to distinguish the input data from different users. If cuid is a terminal identifier, all users who talk to this terminal need to be regarded as one user. device_type is used to acquire the type of source terminal of the input data, to obtain intention recognition models respectively suitable for a screen terminal and a screenless terminal. For details, please refer to the description of Embodiment 3.

S404, determining the intention label of the input data in the target dialogue data based on the category information and the instruction information, and a mapping relationship between the intention label and the category information and the instruction information.

Considering that there are many intention labels in the intention recognition model in practical applications, which may reach thousands; not all of the intentions could be trained using input data. This is because, in order to successfully recognize an intention, a large number of samples are needed as support, but the user's input data are uncertain, resulting in insufficient samples for some intention training. Therefore, it is necessary to select the intention labels that can be trained using input data. Alternatively, the proportion of each intention label may be recognized and counted in the process of online recognition by the intention recognition model, and in combination with the data flow corresponding to each intention label in the online application process, a vertical intention label whose data flow and intention label account for more than a set value may be selected, where the set value may be 40%. In an application scenario, more than 30 intention labels are finally selected.

A mapping relationship between the vertical intention label whose data flow and intention label proportion exceed the set value and the category information and the instruction information is pre-established. In the response data of the target dialogue data, category information and instruction information that have not established a mapping relationship are uniformly mapped to "the other" intention labels. Finally, the input data with different intention labels are negative samples for each other.

S405, label the input data in the target dialogue data with an intention label.

S406, train, according to the set period, the intention recognition model based on the input data in the target dialogue data and the intention label of the input data, so as to perform intention recognition on new input data through the trained intention recognition model.

In the present embodiment, the satisfaction degree feedback log may automatically collect the user's dialogue data and satisfaction degree. Using the satisfaction degree feedback log as the data source, the dialogue data and the satisfaction degree of the dialogue data may be acquired more conveniently and quickly, without additional programming; by pulling the satisfaction degree feedback log of the most recent period according to the set period, and training the intention recognition model according to the set period, so that the model training is performed automatically according to the set period; and at the same time, it is ensured that the model can be updated in time with new online input data.

Further, the user behavior log may automatically collect the user's dialogue data. Using the user behavior log as the data source, the dialogue data may be acquired more conveniently and quickly, without additional programming; the satisfaction degree score of the dialogue data is obtained through the satisfaction degree scoring model, a method for acquiring satisfaction degree is specified; moreover, the satisfaction degree scoring model may be used to score the satisfaction degree objectively and in accordance with a unified standard, which improves the authenticity of the satisfaction degree score; in the case of a large amount of dialogue data, satisfaction degree scores can be obtained quickly and accurately using the satisfaction degree scoring model.

Further, by setting the corresponding relationship between the intention label and the category information and the instruction information, intention labels that can be trained with input data may be flexibly selected, and the recognition accuracy of some intentions may be selectively improved without affecting the recognition accuracy of the other intentions. Moreover, automatic labeling is performed by means of intention label mapping, without manual involvement, which improves the efficiency and accuracy of labeling.

Embodiment 5

Figure 5:
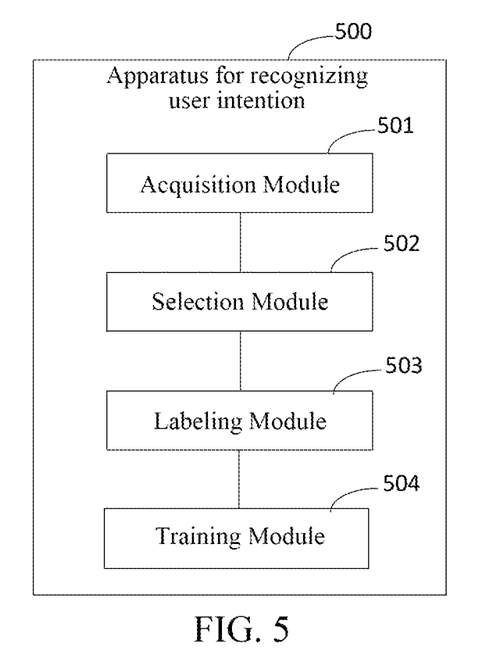
FIG. 5 is a structural diagram of an apparatus for recognizing a user intention in Embodiment 5 of the present disclosure.

FIG. 5 is a structural diagram of an apparatus for recognizing a user intention in Embodiment 5 of the present disclosure. The embodiment of the present disclosure is applicable to the situation where an intention recognition model is used to perform intention recognition on input data of a user. The apparatus is implemented by software and/or hardware, and is specifically configured in an electronic device having certain data computing capabilities.

An apparatus 500 for recognizing a user intention as shown in FIG. 5, includes: an acquisition module 501, a selection module 502, a labeling module 503 and a training module 504; where, the acquisition module 501, configured to acquire a plurality of rounds of dialogue data and a satisfaction degree of each round of dialogue data, each round of dialogue data comprising input data of a user and response data, the response data being fed back based on an intention recognition result obtained by an intention recognition model performing an intention recognition on the input data;

the selection module 502, configured to select, from the plurality of rounds of dialogue data, target dialogue data having a satisfaction degree meeting a set satisfaction condition;

the labeling module 503, configured to label input data in the target dialogue data with an intention label; and the training module 504, configured to train the intention recognition model based on the input data in the target dialogue data and the intention label of the input data, so as to perform intention recognition on new input data by the trained intention recognition model.

In embodiments of the present disclosure, by acquiring a plurality of rounds of dialogue data and a satisfaction degree of each round of dialogue data, and selecting target dialogue data whose satisfaction degree meets a set satisfaction condition, the dialogue data is used as a judgment dimension of the satisfaction degree, which effectively improves the recognition accuracy of the input data; using the satisfaction degree as a filter condition to select appropriate input data, so that the intention recognition result of the selected input data is basically a correct result, thereby ensuring that the selected input data has a certain accuracy, when the intention recognition model is trained based on the input data and the intention label, a model of higher accuracy can be generated. In the present embodiment, the input data used for training is acquired by online recognition through the intention recognition model, and the input data is returned to offline training of the intention recognition model, thus forming a closed loop from online recognition to offline training, which continuously mines a large number of high-accuracy samples from online based on the dialogue satisfaction degree, and drives the intention recognition model to be updated to higher accuracy; and with the continuous improvement of the model recognition accuracy online, the accuracy of the input data may be higher and higher, and the satisfaction degree may be higher and higher, thus forming a virtuous circle, and finally improving the recognition accuracy of the intention recognition model.

Further, the training module 504 is specifically configured to: extract a linguistic feature of the input data in the target dialogue data and a feature associated with the input data; and train the intention recognition model by using the linguistic feature of the input data and the feature associated with the input data as an input, and use the intention label as a target output; where, the feature associated with the input data includes at least one of: a search demand of the input data, response data of the input data, context data of the input data, or statistical data of the input data.

Further, the apparatus also includes a source terminal type acquisition module, configured to acquire types of source terminals of the input data in the target dialogue data; and the training module 504 is specifically configured to: group the input data in the target dialogue data according to the types of the source terminals to obtain a plurality of groups of input data; train, based on a group of input data and an intention label of the group of input data, an intention recognition model corresponding to a type of a source terminal of the group of input data; where, the types of the source terminals comprise a screen terminal type and a screenless terminal type.

Further, the acquisition module 501 is specifically configured to: pull, according to a set period, a satisfaction degree feedback log of a most recent period, the satisfaction degree feedback log comprising the plurality of rounds of dialogue data and the satisfaction degree of each round of dialogue data; the training the intention recognition model based on the input data in the target dialogue data and the intention label of the input data, includes: training, according to the set period, the intention recognition model based on the input data in the target dialogue data and the intention label of the input data.

Further, the apparatus also includes a storage module, configured to: acquire the plurality of rounds of dialogue data from a user behavior log; score, by using a satisfaction degree scoring model, the satisfaction degree of each round of dialogue data in the plurality of rounds of dialogue data, to obtain a satisfaction degree score of each round of dialogue data; and store the plurality of rounds of dialogue data and the satisfaction degree score of each round of dialogue data to the satisfaction degree feedback log.

Further, when the storage module acquires the plurality of rounds of dialogue data from the user behavior log, it is specifically configured to: collect a plurality of rounds of candidate dialogue data using the user behavior log, wherein each round of candidate dialogue data comprises input data of a user and response data, the response data being fed back based on an intention recognition result obtained by an intention recognition model performing an intention recognition on the input data; acquire, based on the intention recognition model, an intention confidence of the input data in each round of candidate dialogue data; and select, from the user behavior log, input data having an intention confidence meeting a set confidence condition and response data of the input data, to form the plurality of rounds of dialogue data.

Further, the labeling module 503 is specifically configured to: acquire category information and instruction information of the response data in the target dialogue data; determine the intention label of the input data in the target dialogue data based on the category information and the instruction information, and a mapping relationship between the intention label and the category information and the instruction information; and label the input data in the target dialogue data with the intention label.

The above apparatus for recognizing a user intention may perform the method for recognizing a user intention provided by any embodiment of the present disclosure, and has the corresponding functional modules and beneficial effects for performing the method for recognizing a user intention.

Embodiment 6

According to an embodiment of the present disclosure, an electronic device and a readable storage medium are provided.

Figure 6:
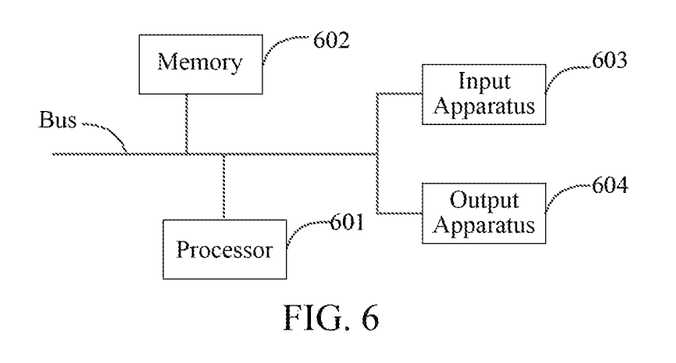
FIG. 6 is a block diagram of an electronic device for implementing the method for recognizing a user intention in embodiments of the present disclosure.

As shown in FIG. 6, a block diagram of an electronic device for implementing the method for recognizing a user intention in embodiments of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by some embodiments of the present disclosure. The memory stores instructions executable by at least one processor, so that the at least one processor performs the method for recognizing a user intention provided by some embodiments of the present disclosure. The non-transitory computer readable storage medium of the present disclosure stores computer instructions for causing a computer to perform the method for recognizing a user intention provided by some embodiments of the present disclosure.

The memory 602, as a non-transitory computer readable storage medium, may be used to store non-transitory software programs, non-transitory computer executable programs and modules, such as program instructions/modules corresponding to the method for recognizing a user intention in embodiments of the present disclosure (for example, the acquisition module 501, the selection module 502, the labeling module 503 and the training module 504 shown in FIG. 5). The processor 601 executes the non-transitory software programs, instructions, and modules stored in the memory 602 to execute various function applications and data processing of the server, that is, to implement the method for recognizing a user intention in the foregoing method embodiments.

The memory 602 may include a storage program area and a storage data area, where the storage program area may store an operating system and at least one function required application program; and the storage data area may store data created by the use of the electronic device for implementing the method for recognizing a user intention, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device that implements the method for recognizing a user intention through a network. Examples of the above network include but are not limited to the Internet, intranet, local area network, mobile communication network, and combinations thereof.

The electronic device that implements the method for recognizing a user intention may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device that implements the method for recognizing a user intention, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, and the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area network (LAN), wide area network (WAN), the Internet, and blockchain network.

The computer system may include a client and a server. The client and the server are generally far from each other and usually interact through the communication network. The relationship between the client and the server is generated by computer programs that run on the corresponding computer and have a client-server relationship with each other.

It should be understood that the various forms of processes shown above may be used to reorder, add, or delete steps. For example, the steps described in embodiments of the present disclosure may be performed in parallel, sequentially, or in different orders, as long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement, etc. made within the spirit and principle of the present disclosure shall be included in the protection scope of the present disclosure.

What is claimed is:

1. A method for recognizing a user intention, comprising:
    acquiring a plurality of rounds of dialogue data and a satisfaction degree of each round of dialogue data, each round of dialogue data comprising input data of a user and response data, the response data being fed back based on an intention recognition result obtained by an intention recognition model performing an intention recognition on the input data;
    selecting, from the plurality of rounds of dialogue data, target dialogue data having a satisfaction degree meeting a set satisfaction condition;
    labeling input data in the target dialogue data with an intention label;
    acquiring types of source terminals of the input data in the target dialogue data; and
    training the intention recognition model based on the input data in the target dialogue data and the intention label of the input data, so that the trained intention recognition model performs intention recognition on new input data, wherein the training the intention recognition model comprises:
        grouping the input data in the target dialogue data according to the types of the source terminals to obtain a plurality of groups of input data; and
        training, based on a group of input data and an intention label of the group of input data, an intention recognition model corresponding to a type of a source terminal of the group of input data, wherein, the types of the source terminals comprise a screen terminal type and a screenless terminal type.

2. The method according to claim 1, wherein the training the intention recognition model based on the input data in the target dialogue data and the intention label of the input data, comprises:
    extracting a linguistic feature of the input data in the target dialogue data and a feature associated with the input data; and
    training the intention recognition model by using the linguistic feature of the input data and the feature associated with the input data as an input, and using the intention label as a target output,
    wherein, the feature associated with the input data comprises at least one of: a search demand of the input data, response data of the input data, context data of the input data, or statistical data of the input data.

3. The method according to claim 1, wherein the acquiring the plurality of rounds of dialogue data and the satisfaction degree of each round of dialogue data, comprises:
    pulling, according to a set period, a satisfaction degree feedback log of a most recent period, the satisfaction degree feedback log comprising the plurality of rounds of dialogue data and the satisfaction degree of each round of dialogue data;
    the training the intention recognition model based on the input data in the target dialogue data and the intention label of the input data, comprises:
    training, according to the set period, the intention recognition model based on the input data in the target dialogue data and the intention label of the input data.

4. The method according to claim 3, wherein, before the pulling the satisfaction degree feedback log of the most recent period according to the set period, the satisfaction degree feedback log comprising the plurality of rounds of dialogue data and the satisfaction degree of each round of dialogue data, the method further comprises:
    acquiring the plurality of rounds of dialogue data from a user behavior log;
    scoring, by using a satisfaction degree scoring model, the satisfaction degree of each round of dialogue data in the plurality of rounds of dialogue data, to obtain a satisfaction degree score of each round of dialogue data; and
    storing the plurality of rounds of dialogue data and the satisfaction degree score of each round of dialogue data to the satisfaction degree feedback log.

5. The method according to claim 4, wherein the acquiring the plurality of rounds of dialogue data from the user behavior log, comprises:
    collecting a plurality of rounds of candidate dialogue data using the user behavior log, wherein each round of candidate dialogue data comprises input data of a user and response data, the response data being fed back based on an intention recognition result obtained by an intention recognition model performing an intention recognition on the input data;
    acquiring, based on the intention recognition model, an intention confidence of the input data in each round of candidate dialogue data; and selecting, from the user behavior log, input data having an intention confidence meeting a set confidence condition and response data of the input data, to form the plurality of rounds of dialogue data.

6. The method according to claim 1, wherein the labeling the input data in the target dialogue data with the intention label, comprises:
acquiring category information and instruction information of the response data in the target dialogue data;
determining the intention label of the input data in the target dialogue data based on the category information and the instruction information, and a mapping relationship between the intention label and the category information and the instruction information; and
labeling the input data in the target dialogue data with the intention label.

7. An electronic device, comprising:
at least one processor; and
a memory, communicatively connected to the at least one processor; wherein,
the memory, storing instructions executable by the at least one processor, the instructions, when executed by the at least one processor, cause the at least one processor to perform operations, the operations comprising:
acquiring a plurality of rounds of dialogue data and a satisfaction degree of each round of dialogue data, each round of dialogue data comprising input data of a user and response data, the response data being fed back based on an intention recognition result obtained by an intention recognition model performing an intention recognition on the input data;
selecting, from the plurality of rounds of dialogue data, target dialogue data having a satisfaction degree meeting a set satisfaction condition;
labeling input data in the target dialogue data with an intention label;
acquiring types of source terminals of the input data in the target dialogue data; and
training the intention recognition model based on the input data in the target dialogue data and the intention label of the input data, so that the trained intention recognition model performs intention recognition on new input data, wherein the training the intention recognition model comprises:
grouping the input data in the target dialogue data according to the types of the source terminals to obtain a plurality of groups of input data; and
training, based on a group of input data and an intention label of the group of input data, an intention recognition model corresponding to a type of a source terminal of the group of input data, wherein, the types of the source terminals comprise a screen terminal type and a screenless terminal type.

8. The electronic device according to claim 7, wherein the training the intention recognition model based on the input data in the target dialogue data and the intention label of the input data, comprises:
extracting a linguistic feature of the input data in the target dialogue data and a feature associated with the input data; and
training the intention recognition model by using the linguistic feature of the input data and the feature associated with the input data as an input, and using the intention label as a target output,
wherein, the feature associated with the input data comprises at least one of: a search demand of the input data, response data of the input data, context data of the input data, or statistical data of the input data.

9. The electronic device according to claim 7, wherein, the acquiring the plurality of rounds of dialogue data and the satisfaction degree of each round of dialogue data, comprises:
pulling, according to a set period, a satisfaction degree feedback log of a most recent period, the satisfaction degree feedback log comprising the plurality of rounds of dialogue data and the satisfaction degree of each round of dialogue data;
the training the intention recognition model based on the input data in the target dialogue data and the intention label of the input data, comprises:
training, according to the set period, the intention recognition model based on the input data in the target dialogue data and the intention label of the input data.

10. The electronic device according to claim 9, wherein, before the pulling the satisfaction degree feedback log of the most recent period according to the set period, the satisfaction degree feedback log comprising the plurality of rounds of dialogue data and the satisfaction degree of each round of dialogue data, the operations further comprises:
acquiring the plurality of rounds of dialogue data from a user behavior log;
scoring, by using a satisfaction degree scoring model, the satisfaction degree of each round of dialogue data in the plurality of rounds of dialogue data, to obtain a satisfaction degree score of each round of dialogue data; and
storing the plurality of rounds of dialogue data and the satisfaction degree score of each round of dialogue data to the satisfaction degree feedback log.

11. The electronic device according to claim 10, wherein the acquiring the plurality of rounds of dialogue data from the user behavior log, comprises:
collecting a plurality of rounds of candidate dialogue data using the user behavior log, wherein each round of candidate dialogue data comprises input data of a user and response data, the response data being fed back based on an intention recognition result obtained by an intention recognition model performing an intention recognition on the input data;
acquiring, based on the intention recognition model, an intention confidence of the input data in each round of candidate dialogue data; and
selecting, from the user behavior log, input data having an intention confidence meeting a set confidence condition and response data of the input data, to form the plurality of rounds of dialogue data.

12. The electronic device according to claim 7, wherein the labeling the input data in the target dialogue data with the intention label, comprises:
acquiring category information and instruction information of the response data in the target dialogue data;
determining the intention label of the input data in the target dialogue data based on the category information and the instruction information, and a mapping relationship between the intention label and the category information and the instruction information; and
labeling the input data in the target dialogue data with the intention label.

13. A non-transitory computer readable storage medium, storing computer instructions, the computer instructions, when executed by a processor, causes the processor to perform operations, the operations comprising:

acquiring a plurality of rounds of dialogue data and a satisfaction degree of each round of dialogue data, each round of dialogue data comprising input data of a user and response data, the response data being fed back based on an intention recognition result obtained by an intention recognition model performing an intention recognition on the input data;

selecting, from the plurality of rounds of dialogue data, target dialogue data having a satisfaction degree meeting a set satisfaction condition;

labeling input data in the target dialogue data with an intention label;

acquiring types of source terminals of the input data in the target dialogue data; and training the intention recognition model based on the input data in the target dialogue data and the intention label of the input data, so that the trained intention recognition model performs intention recognition on new input data, wherein the training the intention recognition model comprises:

grouping the input data in the target dialogue data according to the types of the source terminals to obtain a plurality of groups of input data; and training, based on a group of input data and an intention label of the group of input data, an intention recognition model corresponding to a type of a source terminal of the group of input data, wherein, the types of the source terminals comprise a screen terminal type and a screenless terminal type.

14. The medium according to claim 13, wherein the training the intention recognition model based on the input data in the target dialogue data and the intention label of the input data, comprises:

extracting a linguistic feature of the input data in the target dialogue data and a feature associated with the input data; and training the intention recognition model by using the linguistic feature of the input data and the feature associated with the input data as an input, and using the intention label as a target output, wherein, the feature associated with the input data comprises at least one of: a search demand of the input data, response data of the input data, context data of the input data, or statistical data of the input data.

15. The medium according to claim 13, wherein the acquiring the plurality of rounds of dialogue data and the satisfaction degree of each round of dialogue data, comprises:

pulling, according to a set period, a satisfaction degree feedback log of a most recent period, the satisfaction degree feedback log comprising the plurality of rounds of dialogue data and the satisfaction degree of each round of dialogue data;

the training the intention recognition model based on the input data in the target dialogue data and the intention label of the input data, comprises:

training, according to the set period, the intention recognition model based on the input data in the target dialogue data and the intention label of the input data.

16. The medium according to claim 15, wherein, before the pulling the satisfaction degree feedback log of the most recent period according to the set period, the satisfaction degree feedback log comprising the plurality of rounds of dialogue data and the satisfaction degree of each round of dialogue data, the operations further comprise:

acquiring the plurality of rounds of dialogue data from a user behavior log;

scoring, by using a satisfaction degree scoring model, the satisfaction degree of each round of dialogue data in the plurality of rounds of dialogue data, to obtain a satisfaction degree score of each round of dialogue data; and storing the plurality of rounds of dialogue data and the satisfaction degree score of each round of dialogue data to the satisfaction degree feedback log.

17. The medium according to claim 16, wherein the acquiring the plurality of rounds of dialogue data from the user behavior log, comprises:

collecting a plurality of rounds of candidate dialogue data using the user behavior log, wherein each round of candidate dialogue data comprises input data of a user and response data, the response data being fed back based on an intention recognition result obtained by an intention recognition model performing an intention recognition on the input data;

acquiring, based on the intention recognition model, an intention confidence of the input data in each round of candidate dialogue data; and selecting, from the user behavior log, input data having an intention confidence meeting a set confidence condition and response data of the input data, to form the plurality of rounds of dialogue data.

* * * * *